UNITED STATES PATENT OFFICE.

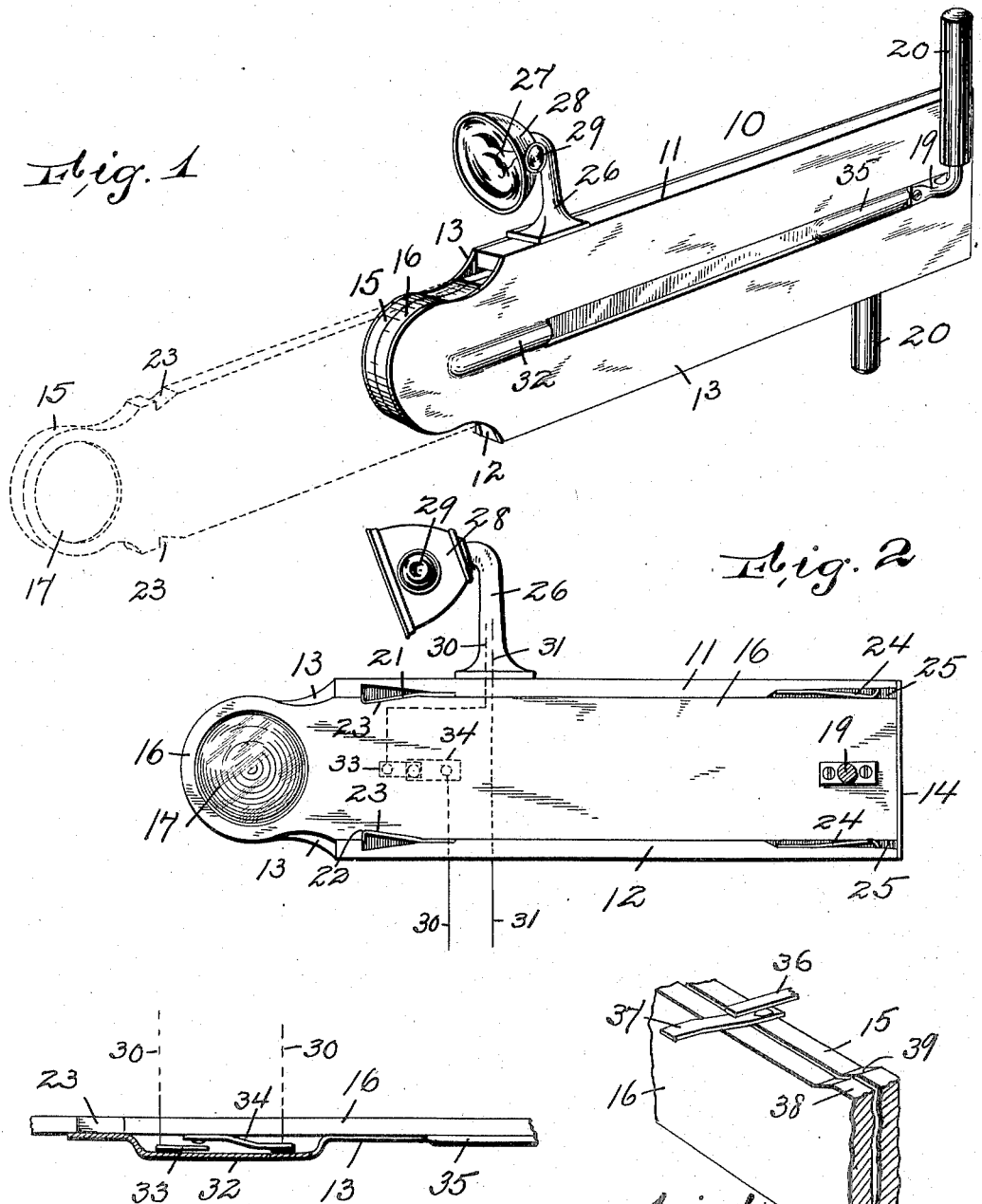

WILLIAM A. GEPPNER, OF IRVINGTON, NEW JERSEY.

SIGNAL DEVICE FOR AUTOMOBILES AND THE LIKE.

1,325,939.   Specification of Letters Patent.   Patented Dec. 23, 1919.

Application filed September 19, 1919. Serial No. 324,961.

*To all whom it may concern:*

Be it known that I, WILLIAM A. GEPPNER, a citizen of the United States, and a resident of Irvington, county of Essex, and State of New Jersey, have invented certain new and useful Improvements in Signal Devices for Automobiles and the like, of which the following is a specification.

This invention relates to an improved signal and is adapted for use on automobiles and the like to indicate the intention of the driver of the car as to its direction or speed.

The invention relates to a device of this kind which has arms adapted to be projected from a casing in place of the habitual swinging out of the arm of the driver himself, the arms being adapted to indicate both to the front and rear, both day and night, whether the car is going to turn or whether it is going to stop.

The invention relates to a device of this kind in which the selection of the arm is easy, and the operating handles are disposed to make the selection easy enough to prevent serious disturbing of the concentration of the driver on the driving of the vehicle.

The invention further resides in a device of this kind in which the number of parts are reduced to the minimum and in which there is very little liability of the device rattling, either when the arms are extended or when they are housed. The structure is small, taking up but little room on the front of the car, preferably above the dashboard, and its simplicity makes its operation assured.

The invention is illustrated in the accompanying drawing, in which Figure 1 is a perspective view of the improved device, showing an arm projected, such projected arm being illustrated in dotted outline. Fig. 2 is a side view of the device with one of the side plates of the casing and one of the handles removed. Fig. 3 is a detail view showing part of an arm in elevation and showing the casing in section to illustrate the operation of an electric switch to operate the light, and Fig. 4 is a perspective view showing how the parts can be arranged to provide for the operation of a signal switch by either of the arms.

The casing is indicated in general by the reference numeral 10 and is preferably made from a top strip 11 and a bottom strip 12 and has sides 13 secured thereto in any suitable manner, the top and bottom strips being preferably made of wood and the side strips 13 of sheet metal, the back strip 14 also being of metal, and when properly japanned or enameled makes a neat casing for the device, being inconspicuous and well adapted for attachment to the vehicle.

Attaching means are omitted as they form no part of this invention, but it is preferred to secure this device at the top of the dashboard or adjacent to the bottom of the wind shield and on the side of the car on which the driver sits.

The casing acts as a housing for the arms that are adapted to be slid from the casing when they are required. I illustrate two arms 15 and 16, which can be painted different colors, and I arrange on each one a ball or jewel 17. As an instance of identification I may have one of the arms coated with yellow having a black ball or jewel 17, the term "ball" defining a rounded face which would have the appearance of a ball from a distance, the other arm being red and having a white ball or jewel, the first of these to indicate that the vehicle is about to turn to the right, and the other that the vehicle is to turn to the left, both the front and rear face of each arm being colored, this number of arms being ordinarily considered sufficient, a car, when intending to turn, being habitually slowed down, and either of the signals can be used to indicate that the driver of the car is reducing its speed. Being seen from the front it would also indicate to an approaching driver on the other side of the street the contemplated change of direction.

On each side 13 of the casing is a slot 18 through which project the arms 19 and the handles 20, one of the handles projecting from one side and the other handle from the other side, and I prefer to extend one upwardly and the other downwardly and to project them a material distance beyond the casing, particularly the one on the rear side. This makes the selection of handle easy. For instance, if the one that projects upwardly on the front is for turning to the right, and the other is for turning to the left, the driver of the car can localize the grasp of his hand on a particular handle without undue delay and with certainty.

A leaf spring 21 is arranged on the top and also on the bottom of the inside of the casing, these springs being secured by suitable means, such as screws or nails, and having a rounded front end 22 and being adapted to project into recesses 23 on the top and bottom edges of each arm. These springs, by their pressure, hold the front part of the arm on which they bear against rattling or against accidental projection by the swinging or the vibration of the car, the inclined spring acting against the inclined face of the opening 23 in which it is placed, thus holding the arm in by friction, but yielding readily when the handle is positively directed by the driver.

Similar springs 24 in the rear of the casing are seated in the recesses 25 and bear against each arm when it is retreated, that is, housed within the casing, so that the whole arm is held against rattling. The springs act even when the arms, which are usually made of wood, shrink, and maintain the arms against rattling at all times.

The casing acts as a support or base for a bracket 26 which has mounted thereon an electric light 27 which is surrounded by a suitable reflector 28, the reflector being inclined and well above the device, as will be clearly seen from Figs. 1 and 2, so that when an arm is projected, a light shows on the end of the arm and on both sides thereof, and the jewels 17 assist in the reflection of the light, further attention being directed to the device by reason of the front and rear sides of the reflector being provided with small bull's-eyes 29, which are preferably red. The light is lighted from a suitable source of electric energy, which is not shown, the wires 30 and 31 being arranged to extend the light through the bracket 26, one of the wires, in the drawing the wire 30, having a switch placed so as to make or break the circuit.

In the form shown, the casing is bulged, as at 32, and the two terminals 33 and 34 are mounted therein and are insulated, of course, from the casing if it is of metal, one of the arms, such as the arm 34, having considerable resiliency thereto and normally bearing against an arm, such as the arm 16, and when so bearing against the arm leaving the switch open. The arm is provided toward the rear thereof, preferably adjacent to the arm 19 of the handle, with a raised or cam surface 35 which engages the terminal 34 when the arm is swung forward, closes the switch and thus completes the circuit to light the light 27 and thus illuminate the arms of the device.

In Fig. 4 I show a modified form of switch with the terminals 36 and 37 illustrated as being mounted above the arms 15 and 16 and having the raised portions 38 and 39, either of which will operate the switch to close it when either of the arms are pushed so as to project them from the casing.

It will be understood that other forms of switch installation can be employed and other minor changes can be made in the device, without departing from the scope of the invention.

I claim:

1. A signal device comprising a casing, parallel arms in the casing and adapted to be slid so as to both project from the same end of the casing, and a handle on each arm, the handles projecting through opposite sides of the casing, the casing being slotted for the passage of the handles.

2. A signal device comprising a casing, parallel arms in the casing and adapted to be slid so as to project from the casing, and handles, one on each arm, one of said handles projecting upwardly on one side of the casing, the other handle projecting downwardly on the other side of the casing.

3. A signal device comprising a flat casing with flat parallel arms in the casing and adapted to be slid from one end thereof, the top and bottom edges of the front part of the arms being recessed and the inner wall of the recesses converging toward the end of the arm, flat springs in the casing adapted to lie in said recesses when the arms are in their innermost position, and handles on the arms for projecting them from the casing.

In testimony that I claim the foregoing, I have hereto set my hand, this 16th day of September, 1919.

WILLIAM A. GEPPNER.